(12) United States Patent
Hoelzle et al.

(10) Patent No.: US 11,418,928 B1
(45) Date of Patent: Aug. 16, 2022

(54) DUPLICATE MESSAGE MANAGEMENT

(71) Applicant: T-MOBILE INNOVATIONS LLC, Overland Park, KS (US)

(72) Inventors: Sean P. Hoelzle, Collegeville, PA (US); Mark Douglas Peden, Paola, KS (US); Jason Phillips, Olathe, KS (US); Raymond E. Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 150 days.

(21) Appl. No.: 17/015,886

(22) Filed: Sep. 9, 2020

(51) Int. Cl.
*H04W 4/12* (2009.01)
*H04W 24/08* (2009.01)

(52) U.S. Cl.
CPC .............. *H04W 4/12* (2013.01); *H04W 24/08* (2013.01)

(58) Field of Classification Search
CPC ........ H04W 4/12; H04W 24/08; H04L 51/12; H04L 51/18; H04L 51/22
See application file for complete search history.

(56) References Cited

U.S. PATENT DOCUMENTS

| 2017/0200122 A1* | 7/2017 | Edson ................... H04L 63/104 |
| 2018/0255010 A1* | 9/2018 | Goyal ................. H04L 63/1441 |
| 2019/0207887 A1* | 7/2019 | Kasheff ................... H04L 51/18 |

\* cited by examiner

*Primary Examiner* — Lester G Kincaid
*Assistant Examiner* — Dung L Lam

(57) ABSTRACT

An adaptable method of monitoring a mobile communication device for duplicate text messages. The method of monitoring for duplicate text messages comprises receiving, by a monitoring application, a text message by a first messaging protocol and a second text message by a second messaging protocol, wherein the first and second text message comprises message metadata and message content. The first and second message metadata is recorded into a message log. The monitoring application compares at least one factor of the second message metadata to the first message metadata stored in the message log and assigns an incident score. The second text message is displayed if the incident score exceeds a user criteria threshold. A user feedback selection input is displayed along with the text message on the display log.

7 Claims, 13 Drawing Sheets

DUPLICATE MESSAGE MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Text messaging has become a ubiquitous form of communication between mobile devices. Texting began in the mid-nineties as a messaging service between mobile device users. Mobile phone customers contract with the cellular provider to send and receive text messages on their mobile devices. Text messaging has grown to a global form of communication that transmits messages between mobile devices, from service providers to mobile devices, from home computing systems to mobile devices, and within applications on home computers and mobile devices.

SUMMARY

In an embodiment, a computer-implemented adaptable method of monitoring a mobile communication device for duplicate text messages is disclosed. The computer-implemented adaptable method of monitoring a mobile communication device for duplicate text messages comprises receiving, by a monitoring application executing on a mobile communication device, a text message by a first messaging protocol, wherein the text message comprises a text message metadata and a text message content, recording the text message metadata into a message log in non-transitory memory of the mobile communication device by the monitoring application, wherein each of the text message metadata comprises at least a message author, and storing the text message content into a message store in non-transitory memory by the monitoring application. The method further comprises comparing, by the monitoring application, one or more factors of the message metadata to the message log, assigning an incident score to the text message, by the monitoring application, in response to comparing the one or more factors of the text message metadata to the metadata stored in the message log, displaying the text message, by the monitoring application, on a display log in response to an user criteria threshold exceeding the incident score of the text message, and suppressing the text message, by the monitoring application, in response to the incident score equaling or exceeding the user criteria threshold. The method further comprises presenting a user feedback notification by the text message on the message log or the display log.

In another embodiment, a computer-implemented adaptable method of monitoring a mobile communication device for duplicate text messages is disclosed. The computer-implemented adaptable method of monitoring a mobile communication device for duplicate text messages comprises receiving, by a monitoring application executing on a mobile communication device, a text message by a first messaging protocol, wherein the text message comprises a text message metadata and a text message content, and recording the text message metadata into a message log by the monitoring application, wherein the text message metadata comprises at least a message author, storing the text message content into a message store by the monitoring application. The method further comprises receiving, by the monitoring application, a network status report, wherein the network status report comprises a network delay status and a network connectivity status, and recording, by the monitoring application, the network status report into a network status log. The method further comprises assigning an incident score, by the monitoring application, to the text message metadata in the message log by comparing the message metadata to the message log, modifying the incident score, by the monitoring application, by comparing the network status report to the message metadata stored in the message log, wherein the monitoring application utilizes one or more of heuristics, mathematical optimization, decision tree, machine learning systems, and artificial intelligence systems, displaying the text message, by the monitoring application, in response to an user criteria threshold exceeding the incident score, and displaying a user feedback notification by the text message on the display screen.

In yet another embodiment, an adaptable method of monitoring a mobile communication device for duplicate text messages is disclosed. The adaptable method of monitoring a mobile communication device for duplicate text messages comprises displaying, by a monitoring application executing on a mobile communication device, a message log with a text message determined duplicate, selecting, by a selectable user feedback notification on the text message, a non-duplicate text message for display, updating, by the monitoring application, a text message metadata stored in the message log, and modifying a user criteria threshold, by the monitoring application, by one or more of heuristics, mathematical optimization, decision tree, machine learning systems, and artificial intelligence systems, wherein the user criteria threshold comprises an inputted user criteria and a learned user criteria.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
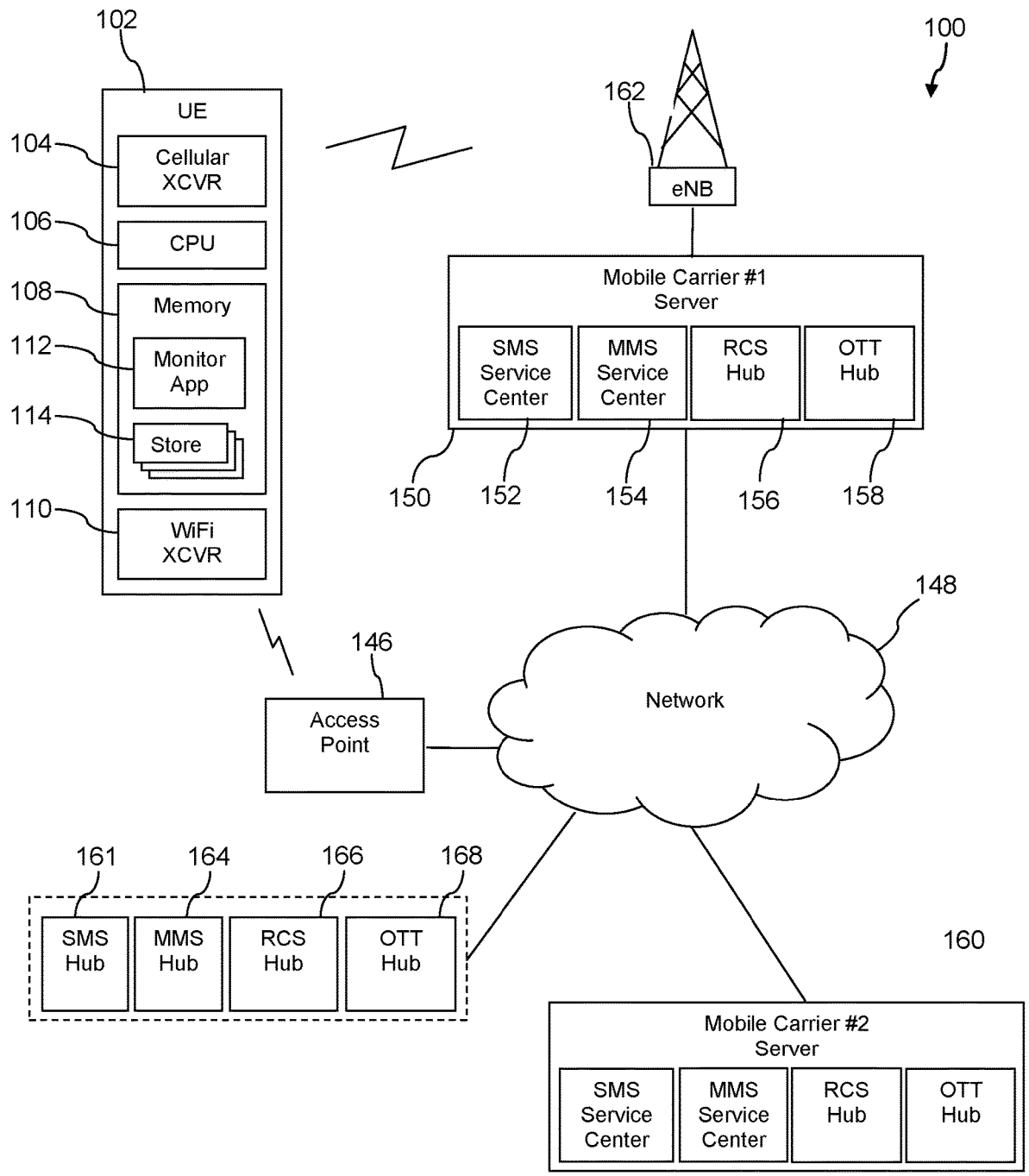
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Text messaging began as a way to send messages from one mobile phone user to another mobile phone user. Text messaging has since grown to include mobile devices, home user devices, business communication, and messages to email. A text message may be used by a retail business to transmit short text messages to notify a mobile user of an event (e.g., account alert) or for advertisement. A text message may be used by the wireless service provider to notify the mobile user of a voice mail message, an account balance, a roaming alert, or other events. A wireless service provider may send text messages to devices in the same wireless network cell, or to devices that are roaming in another wireless service provider's wireless network. Text messages may be sent to a user's email and may be sent from a user's email to a mobile device.

Mobile device users receive text messages from a variety of different messaging protocols. The Short Message Service (SMS) sends text messages over voice network. The SMS-IP messages sends text messages over data network. The Multimedia Message Service (MMS) sends text messages, images, audio, over a combination of voice and data network. The Rich Communication Service (RCS) uses data network for group texting and chat. Over-The-Top (OTT) communications are application based services that support text messaging, image sharing, voice calls, video calls, and video conferencing. Duplicate text messages can become a nuisance to mobile device users. A text message may be sent in a first message technology (e.g., OTT application), and if an acknowledgment from the user device is not timely received, the same message may be sent again in a second message technology (e.g., SMS). This can lead to the delivery of duplicate messages on user devices. Each messaging service (e.g., SMS, SMS-IP, MMS, RCS, OTT application) may resend a message after a designated period of time. For example, a mobile carrier may send a first text message with RCS protocol then resend a second text message as SMS-IP if the RCS protocol did not detect RCS application on the recipient device. The mobile carrier may resend the same message a third time as SMS if the mobile carrier detects that the user is not connected to a data network. The recipient of these messages may have duplicate text messages from the same messaging protocol or from different messaging protocols on the user device.

Duplicate messaging is a technical problem as identical messages are delivered with a unique identity and timestamp. One method to identify duplicate messages would compare the message source (e.g., sender telephone number) and timestamp, but the duplicate messages may also change the messaging protocol. A change in text messaging protocol from SMS-IP to SMS may also change the message header information along with the message identification and timestamp. The message source may change from an email address to a phone number when an RCS message is resent as an SMS message. The multiple messaging platforms present a technical problem for the identification of duplicate text messages that a user device can solve. Since the user's device receives all of the messages, a monitoring application can utilize the user device resources to examine received messages, detect duplicate messages, and suppress duplicate messages to the extent that a user wants them detected. Device side monitoring of duplicate messages can evolve with the user's preferences. For example, the user may desire a lower threshold for duplicate messages for some situations and a higher threshold for other situations. The device can notify the network with a read receipt or other notification when a duplicate message is received. A duplicate message monitoring on a user's device can improve the user experience by monitoring text messages received from multiple messaging platforms for duplicate messages and suppressing duplicate messages to the extent the user desires.

Monitoring for duplicate messages on a user device can also reduce network traffic and improve the network and device efficiency. A user device can notify the mobile carrier network, or another source of the messages, that a message has been received when a duplicate message has been detected. The mobile carrier network (or other source) can respond to this notification by stopping sending the message. Sending the notification from the user device to the mobile carrier network (or other source) can thereby reduce traffic flow in the mobile carrier network by eliminating that unnecessary (because the message has been received) traffic in the network. The detection of duplicate messages on the user device can reduce the number of messages in storage, reduce the number of message notifications, improve the battery life of the device, and improve the overall user experience.

In an embodiment, an application on a user device detects and suppresses duplicate messages. The application may rank the likelihood of text message being a duplicate based on various characteristics of the text message. The application may keep an application message log of received messages. The content of the received messages may be stored in a message store. When a message is received, message metadata associated with that message may be stored in the application message log and the content of the message stored in the message store. The received message metadata may comprise message author, message identification, message timestamp, message data stamp, message protocol, and a message source. The message author may be a name (e.g., John Smith), an IP address (e.g., 123.123.099.001), a phone number, or an email address. One or more parts of the received message metadata may be compared to the metadata of other received messages stored in the application message log. The application may assign an incident score to the received message and modify the assignment based on each comparison. For example, the application may compare the message author to the application message log. If no match is found, the incident score is assigned a zero value and displayed. If a match is found, the incident score is greater than zero and compared to the user criteria threshold. The application may compare various other attributes of the message metadata, such as timestamp, message type, origination network, and message content (e.g., size, length of text, images, attachments, etc.) with other messages in the message store. The displayed message may have a user feedback notification on the text message to notify the application that a duplicate message was displayed.

In an embodiment, the application on a user device may adapt the determination of duplicate messages based on contextual evidence. The application may consider various contextual evidence such as a change of cellular network, a change of the strength of the cellular connection, a loss of WiFi signal, and the restart of a user device. The application may receive a network delay status from the wireless network provider. The wireless network provider may experience a message delivery delay due to a change in the service environment, such as message traffic, cellular network disruption, server updates, or other service environment disruptions. Duplicate messages are more likely with a long network delivery delay as the text messaging service may automatically resent a message after not receiving a reply for a designated time period. Duplicate messages are less likely with a short message delivery delay as the text messages may be delivered within the designated time delay. The wireless network provider may report message delays to the application running on the user device. The application may store the network delay status in a network status log. The application may also monitor the network connectivity for changes in the data network. For example, the application may be connected to the wireless network provider through a WiFi connection to the data network. The application may report the loss of the WiFi connection to the network status log. If the data network connection to the wireless network provider is reestablished through a cellular network connection, the application may report the time without a data network and the cellular connection in the network status log. Duplicate messages are more likely with a complete loss of connection to the data network from the device restarting, the device is turned off during travel, or due to a dead battery. The application may use the network status log along with the text message metadata to determine if a message is a duplicate message.

In an embodiment, the application on a user device may adapt the determination of duplicate messages based on user input. The application may use a combination of inputted user criteria and learned user criteria. The user may input initial user criteria to the application that it may use to determine if a received text message is a duplicate. The initial user criteria may be a high value so that the application will likely suppress all duplicate messages. The criteria may be a low value so that the application may not suppress all duplicate messages. The user may elect a zero value to allow duplicate messages to be displayed. The displayed messages may have a selectable option to identify a displayed message as a duplicate message. Identifying displayed duplicate messages may be used to adapt the application algorithm, for example, using machine learning techniques. The user may also identify suppressed messages as non-duplicate messages from a log of suppressed duplicate messages. The identification of suppressed non-duplicate messages may be used to adapt the application's algorithm. The application may apply a machine learning system to update the learned user criteria. The application may modify the user criteria for duplicate messages with a machine learning system applied to the learned user criteria. The number of duplicate messages identified by the application may adapt based on the learned user criteria.

Turning now to FIG. 1, a mobile communication system 100 is described. In an embodiment, the mobile communication system 100 comprises a mobile communication device (user equipment—UE) 102, a cell site 162, a mobile carrier network 150, and a network 148. A UE 102 may be a cell phone, a mobile phone, a smartphone, a personal digital assistant (PDA), an Internet of things (IoT) device, a wearable computer, a headset computer, a laptop computer, a tablet computer, or a notebook computer. The network 148 may be one or more private networks, one or more public networks, or a combination thereof. The cell site 162 provides wireless communication links to the UE 102 according to a 5G, a long term evolution (LTE), a code division multiple access (CDMA), or a global system for mobile communications (GSM) wireless telecommunication protocol.

The UE 102 may establish a wireless link with the mobile carrier network 150 with a long-range radio transceiver 104 to receive text messages. The UE 102 may include a long-range radio transceiver 104, a processor 106, a memory 108, one or more monitoring applications 112, a message store 114, and a short-range radio transceiver 110. The UE 102 may include a display, a touchscreen display having a touch-sensitive surface for input by a user, a keyboard for input by a user, or a microphone for audio input by a user. The messaging monitoring application 112 may be loaded in a non-transitory portion of the memory 108 and running in the background or execute in response to explicit instructions to connect. The short-range radio transceiver 110 may establish wireless communication with Bluetooth, WiFi, or other low power wireless signals such as ZigBee, Z-Wave, 6LoWPan, Thread, and WiFi-HaLow. The long-range radio transceiver 104 may be able to establish wireless communication with the cell site 162 based on a 5G, a long term evolution (LTE), a code division multiple access (CDMA), or a global system for mobile communications (GSM) telecommunications protocol. The UE 102 may be able to support two or more different wireless telecommunication protocols and, accordingly, may be referred to in some contexts as a multi-protocol device. The UE 102 may communicate with another UE via the wireless link provided by the cell site 162 and via wired links provided by the network 148.

The mobile communication system 100 further comprises a short-range access point (AP) 146 that may provide a wireless communication link via the short-range radio transceiver 110 to the UE 102 and thereby communicatively couple the device 102 to the network 148. In an embodiment, the AP 146 is a WiFi access point. In some circumstances, it may be desirable for the device 102 to complete data calls and/or voice calls via the AP 146 rather than via the cell site 162, for example, to reduce tolling of data usage of a limited data communication service subscription plan and to reduce loading on a cellular infrastructure.

The mobile carrier network 150 comprises a SMS service center (SMSC) 152, a MMS service center (MMSC) 154, a RCS hub 156, and an OTT hub 158. These entities 152, 154, 156, and 158 may provide various text messaging services. The mobile carrier network 150 may provide voice, data, and text messaging through a wireless link utilizing the cell site 162 and through the network 148 to an AP 146. The mobile carrier network 150 may connect and transmit voice calls and SMS messages through a circuit-switched network. The circuit-switched network may be a hardware-dependent legacy network. The mobile carrier network 150 may connect and transmit voice calls and messaging through a data network. The data network may be an IP multimedia Core Network Subsystem (IMS) that sends and receives digital data utilizing IP packet switching, such as the global standard IP protocol. The IMS subsystem may deliver voice (e.g., Voice over IP (VoIP) and WiFi Calling (VoWIFI)), messaging (e.g., RCS), and multimedia (e.g., video and audio clips) using IP packet-switched network. The mobile carrier network 150 may utilize a combination of both the circuit-switched network for voice calls and a data network for voice calls, messages, and data.

The SMS service center (SMSC) 152 controls the routing of SMS messages through the mobile carrier network 150 to the designated wireless device (e.g., UE 102). The SMS service allows users to send and receive text messages, up to 160 characters, on a mobile phone, or other wireless devices. The SMS service utilizes a customer database (e.g., mobile phone number, user accounts, etc.) to identify the sender and recipient of the messages. The SMS service uses a voice network connection but not a data network connection. SMS-IP messages are identical to SMS messages, except they utilize a data network instead of a voice network. SMS-IP messages may also originate with an email sent from a user device (e.g., UE 102) to the mobile device through the mobile carrier network 150. The SMS messages may be sent through a circuit-switched network or sent through a data network. The SMSC 152 may be configured for mobile carrier network 150 utilizing the Global System for Mobile Communications (GSM) standard, as well as on other Time Division Multiple Access (TDMA) and Code Division Multiple Access (CDMA) standards. The SMSC may store SMS messages when the designated wireless device, e.g., UE 102, is not active on the network. If the UE 102 is inactive when an incoming SMS message is sent to the device, the SMSC 152 may continue to send messages or hold the SMS message until the UE 102 is again active on the network.

The MMSC 154 controls the routing of MMS messages through the mobile carrier network 150 to the designated wireless device (e.g., UE 102). The Multimedia Message Service (MMS) is a wireless service to transmit messages with images (e.g., digital photos, pictures, graphics, etc.), audio, video clips, and text. The MMS message delivered to the destination device contains a URL pointer to a server that contains the multimedia content. The MMSC 154 may be configured for the mobile carrier network 150 utilizing 3GPP standard and the Open Mobile Alliance standards for mobile carriers. The MMSC 154 may receive an MMS message carrying content for delivery to a designated wireless device. The MMSC 154 may store the content and send a specially-coded SMS message to the UE 102, providing the UE 102 with a URL pointing to the content stored on the MMSC 154. Upon receipt of the SMS message, the UE 102 may then connect to the data network to download the content from the designated URL to the UE 102.

The RCS Hub 156 may route RCS messages through the mobile carrier network 150 with the data network. RCS is a wireless protocol to transmit messages with read receipts, group texting, group chat, along with digital content such as pictures, audio, and video clips. RCS message service will also allow a mobile user a shared audio or video connection with another mobile user. The RCS message service uses a data network connection to send and receive messages. A RCS message service may query another user's device and may send a SMS message if the recipient device does not support RCS messages. The RCS hub 156 may connect to the mobile carrier network 150 via an IMS subsystem utilizing wireless standards 3GPP, 3GPP2, and ETSI TISPAN developed for mobile carrier networks. Alternatively, a RCS Hub 156 may be a server routing RCS messages through a mobile carrier network 150 that doesn't have an IMS subsystem. Mobile user applications that utilize RCS message service include Chat and Messages.

The OTT Hub 158 may send and receive data from the OTT application on the UE 102. OTT communications provide texting, voice calls, and video conferencing with other mobile device users. OTT communications may be application-based service that connects mobile device users with other users in a user directory. OTT communications require a data connection through a wireless service provider or a data connection over the Internet. The OTT application may be loaded into the memory of the user device or may be integrated with the user device operating system. The OTT Hub 158 may route the data through the mobile carrier network 150 to the network 148 to connect with another user. The OTT application may be downloaded from an OTT provider such as iMessage, Skype, WhatsApp, Instagram Direct, WeChat, Line, Telegram, Yahoo messenger, and Facebook messenger.

The mobile communication system 100 further comprises a second mobile carrier network 160. The second mobile carrier network 160 may be utilizing a second standard carrier protocol (GSM, TDMA, CDMA) from the first mobile carrier network 150. The second mobile carrier network 160 may have a SMSC, MMSC, RCS Hub, and OTT Hub for receiving and transmitting messages. The second mobile carrier network 160 may be geographically local (e.g., within the same service area) of the first mobile carrier network 150. The second mobile carrier network 160 may be geographically separated (e.g., located in another city or another country).

Servers called hubs may be used to connect messaging services between a first mobile carrier network 150 and a second mobile carrier network 160. The first mobile carrier network 150 may use a proprietary protocol for SMS messaging, MMS messaging, RCS messaging, and OTT server. The second mobile carrier network 160 may use a second proprietary protocol for SMS messaging, MMS messaging, RCS messaging, and OTT server. A SMS hub 161 may be used to translate the SMS messages from the first proprietary protocol to a second proprietary protocol. A MMS hub 164 may be used to translate the MMS messages from the first proprietary protocol to a second proprietary protocol. A RCS hub 166 may be used to translate the RCS messages from the first proprietary protocol to a second proprietary protocol. An OTT hub 168 may be used to translate the OTT data traffic from the first proprietary protocol to a second proprietary protocol.

Figure 2:
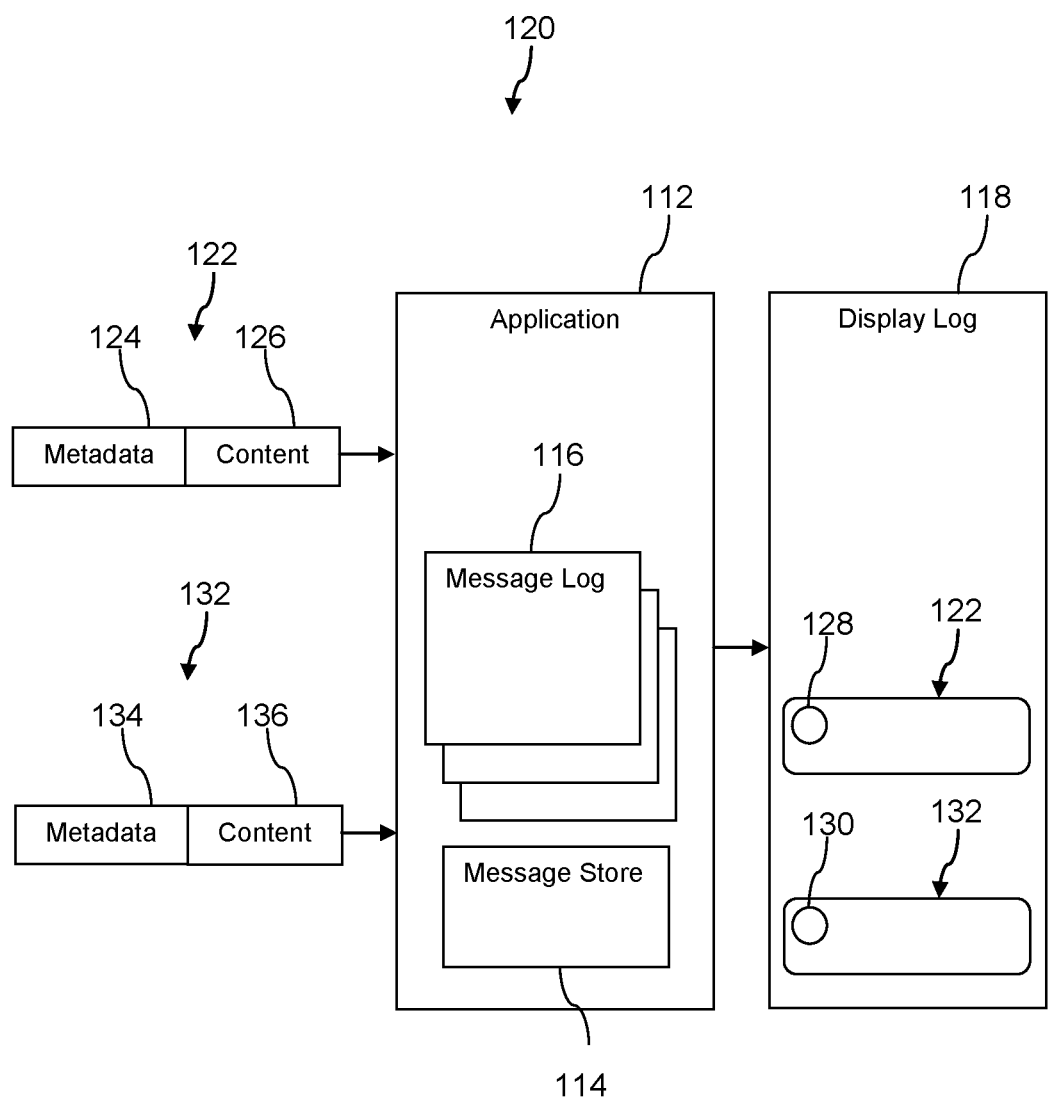
FIG. 2 is a block diagram of a communication system according to another embodiment of the disclosure.

Turning now to FIG. 2, a method 120 of suppressing duplicate messages is described. In an embodiment, the method 120 may include the monitoring application 112, a message log 116, the message store 114, and a display log 118. The monitoring application 112 executing in the memory 108 of the UE 102 may receive a text message 122. The text message 122 may be comprised of message metadata 124 and message content 126. The message metadata 124 may be comprised of the message author, message identification, message protocol, message timestamp, message data stamp, the message header, date and time sent, date and time modified, an identifiable tag, a message content size, and a number of characters of the message content. The message content 126 may depend on the type of message sent: SMS, SMS-IP, MMS, RCS, or OTT. The message content 126 may include alphanumeric letters, images, audio clips, and video clips. The monitoring application 112 may store the message metadata 124 in the message log 116 and the message content 126 in the message store 114.

The monitoring application 112 may determine if a text message is a duplicate text message by comparing an incident score to a user criteria threshold. The incident score may be determined by comparing one or more component, also called a factor, of the message metadata 124 to the message log 116. The monitoring application 112 may assign an incident score by comparing one factor of the message metadata 124 to the message log 116. The monitoring application 112 may assign an incident score with a partial match of two or more factors when comparing the message metadata 124 to the message log 116. The user criteria threshold may be comprised of inputted criteria and learned criteria. The user may be able to select a level of inputted criteria for the duplicate detection of the monitoring application 112. The inputted criteria may be the probability of a message being a duplicate message. For example, if the user inputs 50%, then the application would suppress any message with an incident score equal to or greater than 50%. The inputted criteria may be based on a percentage of 0% to 100%, a range of 0 to 100, or a graphical presentation such as a pie chart, sliding bar, or a gauge with an indicator (e.g., a slider or a gauge needle). In an embodiment with the graphical presentation, the monitoring application 112 may calculate the inputted criteria score (e.g., the percentage) based on the position the user places the indicator on the graphical presentation. In an embodiment, the inputted criteria may be determined from the number of factors (a component of the metadata) selected. The user may select 0 to 7 factors for the application to use to determine the incident score. The probability that a text message is a duplicate may be increased by half for each factor selected. For example, the probability that a text message is a duplicate is 50% when only one factor is selected. The probability may be increased to 75% with two factors: 50% plus half of 50%. The probability may increase to 87.5% with three factors: 75% plus half of 25%. The probability may be increased to 99% when all seven factors are selected.

The monitoring application 112 may compare one factor, for example, the message author, of the message metadata 124 to the message log 116. The message author may be a person's name, an IP address, a phone number, or an email address. If the monitoring application 112 does not find a match, then the message is not a duplicate. If the monitoring application 112 finds a match, then an incident score of 50% is assigned to the message. The monitoring application 112 may compare a single factor multiple times in combinations with other factors. For example, the factor time stamp may be compared with other factors such as "datestamp and time stamp" and "message protocol and time stamp." The monitoring application 112 may compare two factors, for example, the date stamp and time stamp, to the message log 116, and assign an incident score for a partial match. For example, an incident score may be assigned if the date stamp matches, but the time stamp does not. The monitoring application 112 may then compare three factors, such as the message protocol, message header, and time stamp. The monitoring application 112 may assign an incident score for a partial match. Referring back to FIG. 1, a first text message header may indicate an SMS message was received from SMS hub 161. The SMS message originated from mobile carrier network 160 and was routed through SMS Hub 161 to SMSC 152 of the mobile carrier network 150. A second SMS message may be sent from SMSC 152 with a different message header and time stamp. The monitoring application 112 may compare the message protocol, SMS message, the text message header, from SMS hub 161 and SMSC 152, and the text message time stamp. The monitoring application may determine a partial match from the message protocol.

The monitoring application 112 may designate text message 122 as a duplicate when the incident score exceeds the user criteria threshold based on comparing the factor of the message metadata 124 to the factors of the message log 116. The incident score of the text message 122 is stored with the message metadata 124 in the message log 116, and the message content 126 remains stored in the message store 114. The text message 122 is not displayed on the display log 118.

Figure 3:
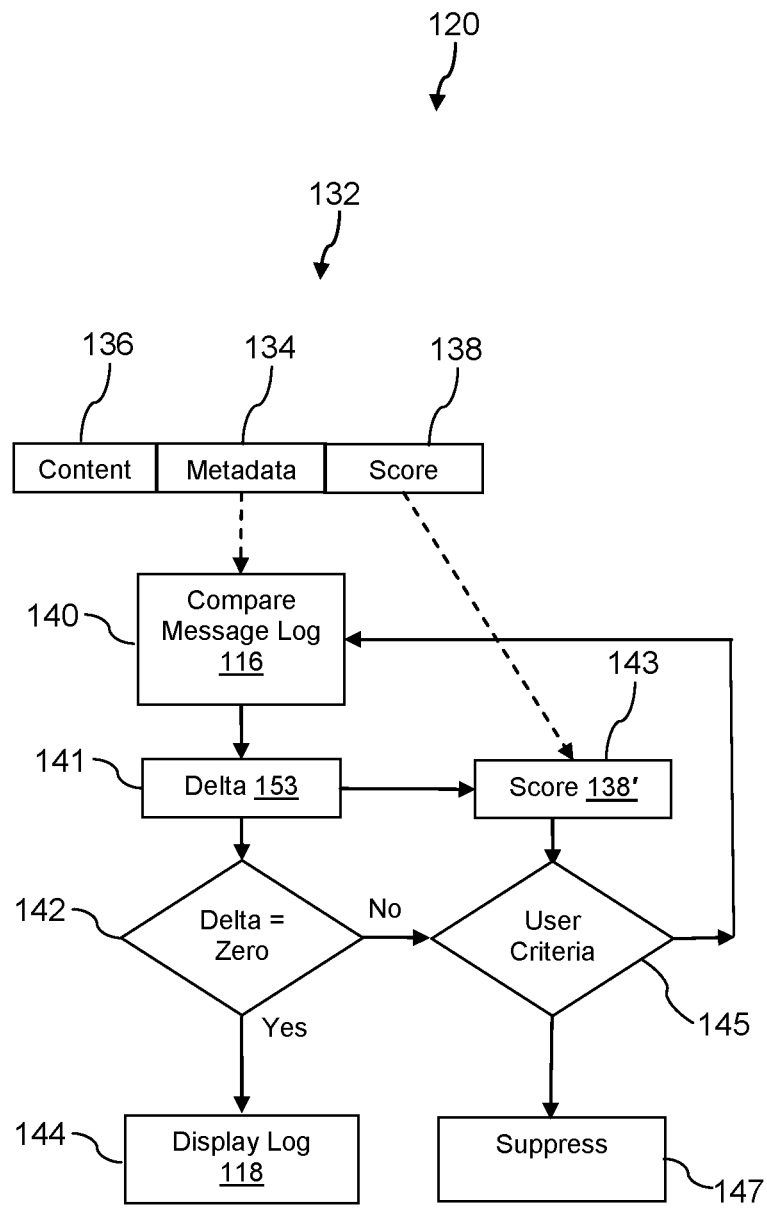
FIG. 3 is a logical flow diagram of a communication system according to another embodiment of the disclosure.

Turning to FIG. 3, a logical flow diagram of the method 120 of suppressing duplicate messages is described. A second text message 132 may be received by the monitoring application 112. The monitoring application 112 may store the message metadata 134 in the message log 116 and the message content 136 in the message store 114. The monitoring application 112 may apply an incident score 138 to the message metadata 134 of text message 132 saved in the message log 116. At step 140, the monitoring application 112 may compare one or more factors of the message metadata 134 of the text message 132 to the message metadata 124 of the first text message 122 stored in the message log 116 to determine a delta value 153. For example, if the first factor of the message metadata 134 matches the factor stored in the message log 116, a fifty may be assigned to the delta value 153. If the first factor does not match, then a zero may be assigned to the delta value 153. At step 141, the delta value 153 is written to the message metadata 134 of text message 132. A unique delta value 153 may be assigned with each comparison made by the monitoring application 112. The delta value 153 is sent to step 143. At step 143, the delta value 153 is added to the incident score 138, and the new value of incident score 138' is assigned to the metadata 134. At step 142, if the monitoring application 112 determines the delta value 153 is equal to zero, then the monitoring application moves to step 144 to display text message 132 on the display log 118. A delta value 153 of zero means the message metadata 134 is different, and therefore the text message 132 is not a duplicate. At step 142, if the delta value is greater than zero, then the monitoring application continues to 145. At step 145, the monitoring application may compare the incident score 138' from step 143 to the inputted user criteria. If the incident score 138' is greater than or equal to the inputted user criteria, then the monitoring application may move to step 147 and suppresses the text message 132. At step 147, the text message 132 may not be displayed on the display log 118, but the message content 136 remains in the message store 114, and the message metadata 134 remains in the message log 116.

If the incident score 138' is less than the inputted user criteria, then the monitoring application 112 may return to step 140. The monitoring application 112 may compare a second factor of the message metadata 134 to a second factor saved in the message log 116. A unique delta value 153 may be assigned at step 141. The monitoring application 112 may continue to step 142. If the monitoring application 112 determines the delta value 153 is equal to zero, then the monitoring application moves to step 144 to display text message 132 on the display log 118.

Returning to FIG. 2, the monitoring application 112 moves the text message 132 to the display log 118 when the delta value 153 is equal to zero. The display log 118 may be a scrollable display of the text messages determined, not a duplicate by the monitoring application 112. The displayed text message 132 may have a user feedback notification 130 displayed on the text message 132.

In an embodiment, the user feedback notification 130 may be a selectable display option that the user can select or "click on" to indicate that the message is a duplicate. The user feedback notification 130 may comprise a button. The user feedback notification 130 may cause the shape of the text message 132 to change (e.g., from square to oval). The user feedback notification 130 may cause a symbol (e.g., a checkmark) to be added to a region of the text message 132. The user feedback notification 130 may cause a visual change to the text message 132, for example, a background color change, a text color change, or an outline color change.

In an embodiment, the monitoring application 112 may compare two or more factors of the message metadata 134 to the message log 116 at step 140 to assign a delta value 153 at step 141. For example, the monitoring application 112 may compare the date stamp and timestamp of the message metadata 134 to the message log 116. The monitoring application 112 may assign a zero to the delta value 153 if either comparison fails to match.

Figure 4:
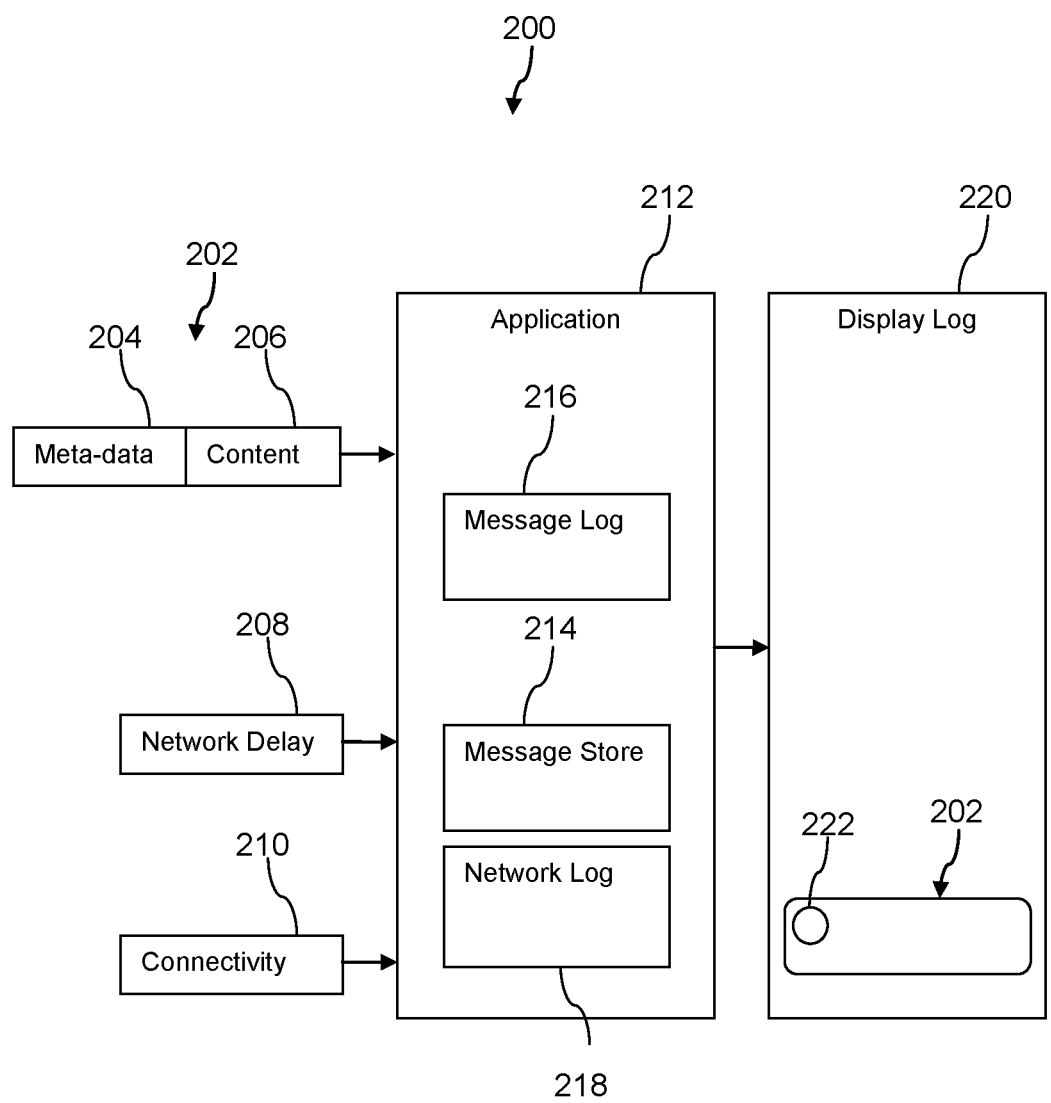
FIG. 4 is a block diagram of a communication system according to a further embodiment of the disclosure.

Turning now to FIG. 4, a method 200 of suppressing duplicate messages is described. The method 200 may include a monitoring application 212, a message log 216, a message store 214, a network status log 218, and a display log 220. A monitoring application 212 executing in the memory 108 of the UE 102 may receive a text message 202. The text message 202 may be comprised of message metadata 204 and message content 206. The message metadata 204 may be comprised of the message author, message identification, message protocol, message timestamp, message data stamp, the message header, date and time sent, date and time modified, an identifiable tag, a message content size, and a number of characters of the message content. The message content 206 may depend on the type of message sent: SMS, SMS-IP, MMS, RCS, or OTT. The message content 206 may include alphanumeric letters, images, audio clips, and video clips. The monitoring application 212 may store the message metadata 204 in the message log 216 and the message content 206 in the message store 214.

The monitoring application 212 may monitor the UE 102 for wireless connectivity to the cellular network and data network. The monitoring application 212 may record a network status report into a network status log 218. A network status report may comprise a network delay status 208 and a network connectivity status 210. The UE 102 may periodically poll the wireless connection (as shown in FIG. 1) from the short-range radio transceiver 110 to the AP 146. The UE 102 may periodically poll the wireless connection to the data network through the wireless connection between the long-range radio transceiver 104 to the cell site 162. The network connectivity status 210 may include a connection to an AP 146, a loss of connection, a continued connection, or a connection to a different AP 146. The network connectivity status 210 may include a connection to a cell site 162, a loss of connection to cell site 162, a continued connection, or a connection to a different cell site. The network connectivity status 210 may also report a loss of connection to the data network while connected to the AP 146. When the UE 102 detects a loss of connectivity to the data network through the AP 146, the UE 102 may automatically switch to the data network utilizing connectivity to mobile carrier network 150 via the cell site 162. The network connectivity status 210 may also report an established connection or loss of connection to the data network while connected to the cell site 162.

The mobile carrier network 150 may report a network delay status 208 to the UE 102. The mobile carrier network 150 may identify a delay in the delivery of text messages due to high message traffic, cellular network disruption, message server updates, or an equipment issue. The mobile carrier network 150 may report a delay of a fraction of a second, a whole second, or multiple seconds. The mobile carrier may report a delay from a single text messaging protocol, e.g., RCS hub 156, or a delay affecting multiple messaging protocols. The network delay status 208 may be reported through the wireless connection established between the cell site 162 and the long-range radio transceiver 104. The network delay status 208 may be reported through the data network connected through network 148 and AP 146 to the short-range radio transceiver 110.

In an embodiment, the monitoring application 212 may itself read the current network delay from a data store, for example, when the monitoring application 212 chooses.

A text message 202 may be received by the monitoring application 212. The monitoring application 212 may store the message metadata 204 in the message log 216 and the message content 206 in the message store 214. The monitoring application 212 may apply an incident score to the message metadata 204 stored in the message log 216 of the text message 202. The monitoring application 212 may determine text message 202 is a duplicate text message by comparing an incident score to a user criteria threshold. The incident score may be determined by comparing at least one component of the message metadata 204 to the message log 216. The user criteria threshold may be comprised of inputted criteria and learned criteria. As previously disclosed in FIG. 2, the user may select a level of inputted criteria for the duplicate detection of the monitoring application 212. In an embodiment, the inputted criteria may be the probability of a message being a duplicate message. The inputted criteria may be in the form of a percentage, a number scale, or a graphical presentation.

The text message 202 may be displayed on the display log 220 when the delta value is equal to zero, and therefore the metadata may be different than the metadata stored in the message log 216. The display log 220 may be a scrollable display of the text messages determined not a duplicate by the monitoring application 212. The displayed text message 202 may have a user feedback notification 222 displayed on the text message 202. As previously disclosed in FIG. 2, the user feedback notification 222 may be a selectable display option that the user can select or "click on" to indicate that the message is a duplicate.

Figure 5:
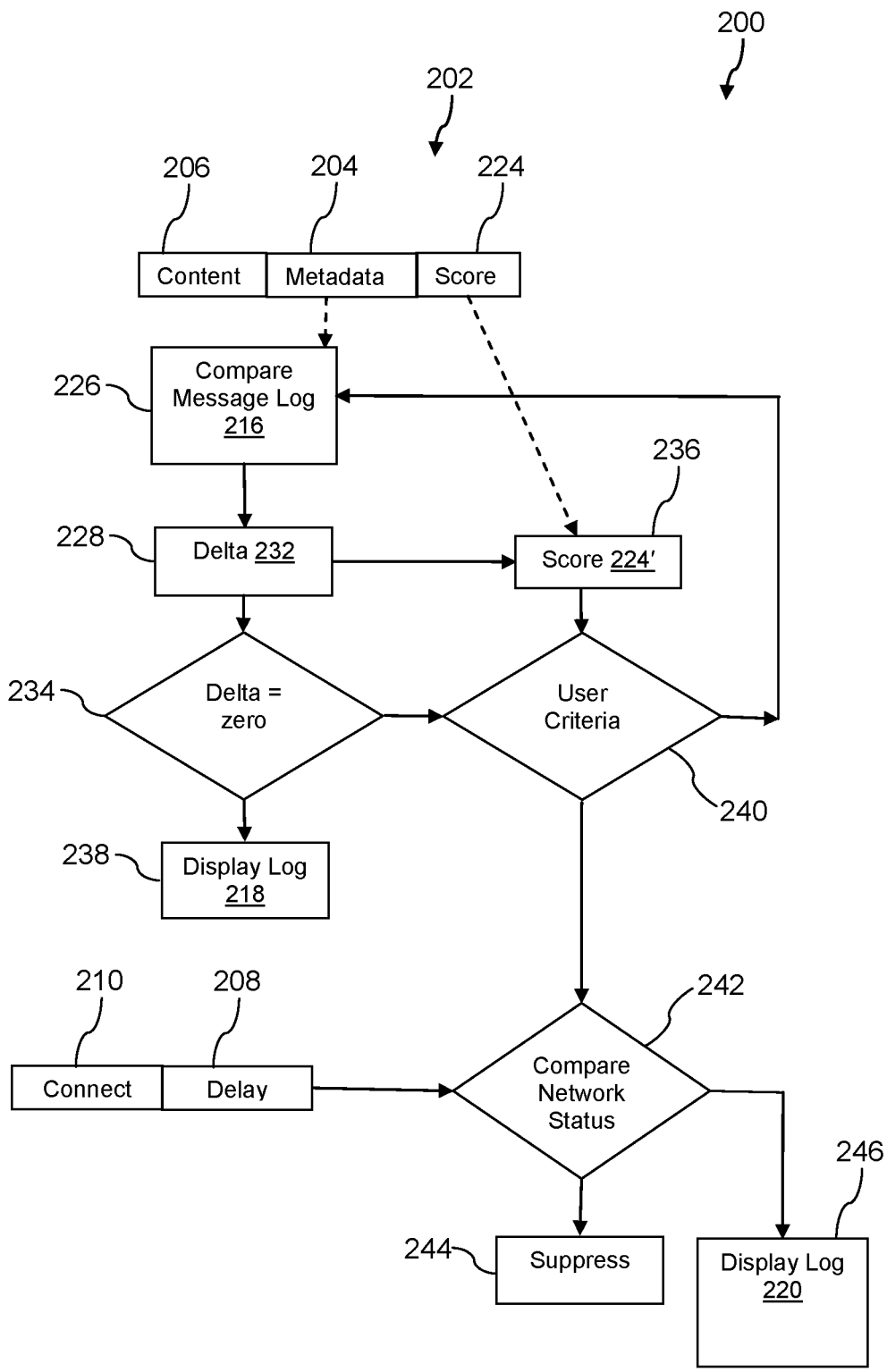
FIG. 5 is a logical flow diagram of a communication system according to a further embodiment of the disclosure.

Turning now to FIG. 5, a logical flow diagram of the method 200 of suppressing duplicate messages is described. The monitoring application 212 may apply an incident score 224 to the message metadata 204 of text message 202 saved in the message log 216. At step 226, the monitoring application 212 may compare one or more factors of the message metadata 204 of the text message 202 to the metadata stored in the message log 216 to determine a delta value 232. The monitoring application 212 may compare a single factor such as a message author. The monitoring application 212 may compare two or more factors such as message protocol, the message header, and time stamp and assign an incident score 224 for a partial match. For example, if the first factor of the message metadata 204 matches the factor stored in the message log 216, but two other factors do not match, a value may be assigned to the delta value 232. If none of the factors match, then a zero may be assigned to the delta value 232. At step 228, the delta value 232 is written to the message metadata 204 of text message 202, and the delta value 232 is sent to step 236. At step 236, the delta value 232 is added to the incident score 224, and the new value of incident score 224' is assigned to the metadata 204. At step 234, if the monitoring application 212 determines the delta value 232 is equal to zero, then the monitoring application moves to step 238 to display text message 202 on the display log 220. A delta value 232 of zero may determine the message metadata 204 is different, and therefore the text message 202 is not a duplicate. At step 234, if the delta value is greater than zero, then the monitoring application continues to 240. At step 240, the monitoring application may compare the incident score 224' from step 236 to the inputted user criteria. If the incident score 224' is less than the inputted user criteria, then the monitoring application 212 returns to step 226. If the incident score 224' is greater than or equal to the inputted user criteria, then the monitoring application continues to step 242.

At step 242, the monitoring application 212 may compare any of the network delay status 208 and the network connectivity status 210 to the message metadata 204 of the text message 202. The monitoring application 212 may compare the network connectivity status 210 to the message metadata 204 to determine if the message is a duplicate. For example, the network connectivity status 210 may report a loss of connection to the data network by both the wireless connection to the AP 146 and the wireless connection to the cell site 162. The monitoring application 212 may compare the amount of time disconnected from the data network to the time between timestamps of the message metadata 204 and the previous message metadata stored in the message log 216.

The monitoring application 212 may compare the network delay status 208 to the message metadata 204 to determine if the message is a duplicate. The network delay status 208 may report any number of sections without departing from the spirit or scope of the present disclosure, including without limitation any of a fraction of a second, 1, 2, 3, 4, 5, 6, 7, 8, 9, 10, or more seconds of delay. The monitoring application 212 may compare the network delay status 208 to the amount of time between timestamps of the message metadata 204 and the previous message metadata stored in the message log 216.

The monitoring application 212 may compare only one or both of the network connectivity status 210 or the network delay status 208 to the message metadata 204. The monitoring application 212 may compare the network connectivity status 210 before the network delay status 208. The monitoring application 212 may compare the network delay status 208 before the network connectivity status 210. The monitoring application 212 may compare one of either network connectivity status 210 or the network delay status 208 and move to the next step without comparing the other.

The monitoring application 212 may apply one or more of heuristics, mathematical optimization, decision tree, machine learning systems, and artificial intelligence systems to compare the message metadata 204 to the network connectivity status 210 and the network delay status 208. The machine learning systems may modify the modified incident score 224' of the text message 202 saved with the message metadata 204 in the message log 216.

The monitoring application 212 may determine the text message 202 is a duplicate by the modified incident score 224' and move to step 244. At step 244, the monitoring application 212 may not display the text message 202 on the display log 220, but the message content 206 remains in the message store 214, and the message metadata 204 remains in the message log 216.

The monitoring application 212 may determine the text message 202 is not a duplicate and move to step 246. At step 246, the text message 202 may be displayed on the display log 220.

Figure 6:
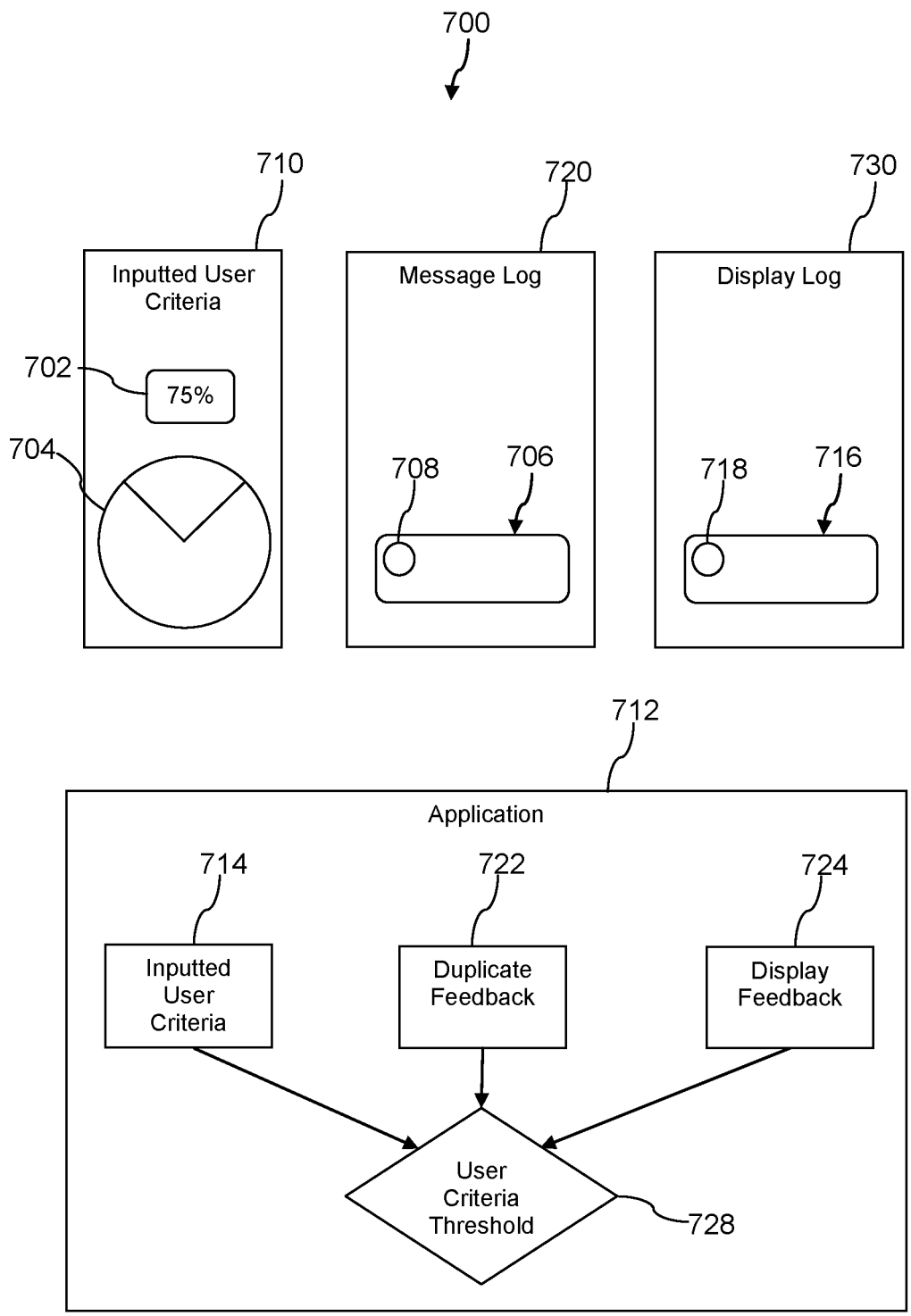
FIG. 6 is a block diagram and a logical flow diagram of a communication system according to an embodiment of the disclosure.

Turning now to FIG. 6, a block diagram illustrates an embodiment of an adaptable method 700 of monitoring a mobile communication device for duplicate text messages. A monitoring application 712 may be executing in memory 108 of UE 102 (as shown in FIG. 1). The monitoring application 712 may compare the incident score assigned to the metadata of a text message to the user criteria threshold 728 (as disclosed in FIG. 3 and FIG. 5) to determine if a message is a duplicate message. The user criteria threshold 728 may consist of an inputted user criteria 714, a duplicate feedback 722, and a display feedback 724.

The inputted user criteria 714, as previously disclosed in FIG. 2 and FIG. 4, may be a numerical input 702, e.g., a percentage, entered on an input screen 710 within the monitoring application 712 or within a device settings menu on the UE 102. The input screen 710 may have a numerical input 702 or a graphical input 704 for the inputted user criteria 714. Alternatively, the inputted user criteria 714 may be calculated from where the user places the indicator on the graphical input 704. The user criteria threshold 728 may be calculated by incorporating the inputted user criteria 714.

The message log 720 may display a text message 706 that the monitoring application 712 determined to be duplicate and suppressed. The user may open the message log 720 to review the duplicate text messages. The message log 720 may be a scrollable display of the text messages. The text message 706 may have a user feedback notification 708 displayed on or next to each text message.

The user feedback notification 708, as previously disclosed, may present a selectable display option that the user can select or "click on" to indicate that the message designation has changed from duplicate to non-duplicate. The user feedback notification 708 may comprise a button. The user feedback notification 128 may cause the shape of the text message 706 to change (e.g., from square to oval). The user feedback notification 708 may cause a symbol (e.g., a checkmark) to be added to a region of the text message 706. The user feedback notification 708 may cause a visual change to the text message 706, for example, a background color change, a text color change, or an outline color change.

The selection of the user feedback notification 708 may be saved as duplicate feedback 722 within the monitoring application 712. The monitoring application 712 may modify the user criteria threshold 728 based on the duplicate feedback 722.

The display log 730 may display a text message 716 that the monitoring application 712 determined was not a duplicate. The user may open the display log 730 to view the text messages. The text message 716 may have a user feedback notification 718 displayed on or next to each text message. The user feedback notification 718 on the display log 730 may be a selectable display option that the user can select or "click on" to indicate that the message designation has changed from non-duplicate to duplicate.

The selection of the user feedback notification 718 may be saved as display feedback 724 within the monitoring application 712. The monitoring application 712 may modify the user criteria threshold 728 based on the display feedback 724.

The monitoring application 712 may develop a learned user criteria from the duplicate feedback 722 and display feedback 724. The monitoring application 712 may apply one or more of heuristics, mathematical optimization, decision tree, machine learning systems, and artificial intelligence systems to the duplicate feedback 722 and display feedback 724 to modify the learned user criteria. The user criteria threshold 728 may increase based on the learned user criteria, which may result in a decrease in the number of text messages determined duplicate. The user criteria threshold 728 may decrease based on the learned user criteria, which may result in an increase in the number of text messages determined duplicate. The learned user criteria may modify the user criteria threshold 728 for a targeted factor of the metadata. For example, the user criteria threshold 728 may be modified for the author of the text message.

Figure 7:
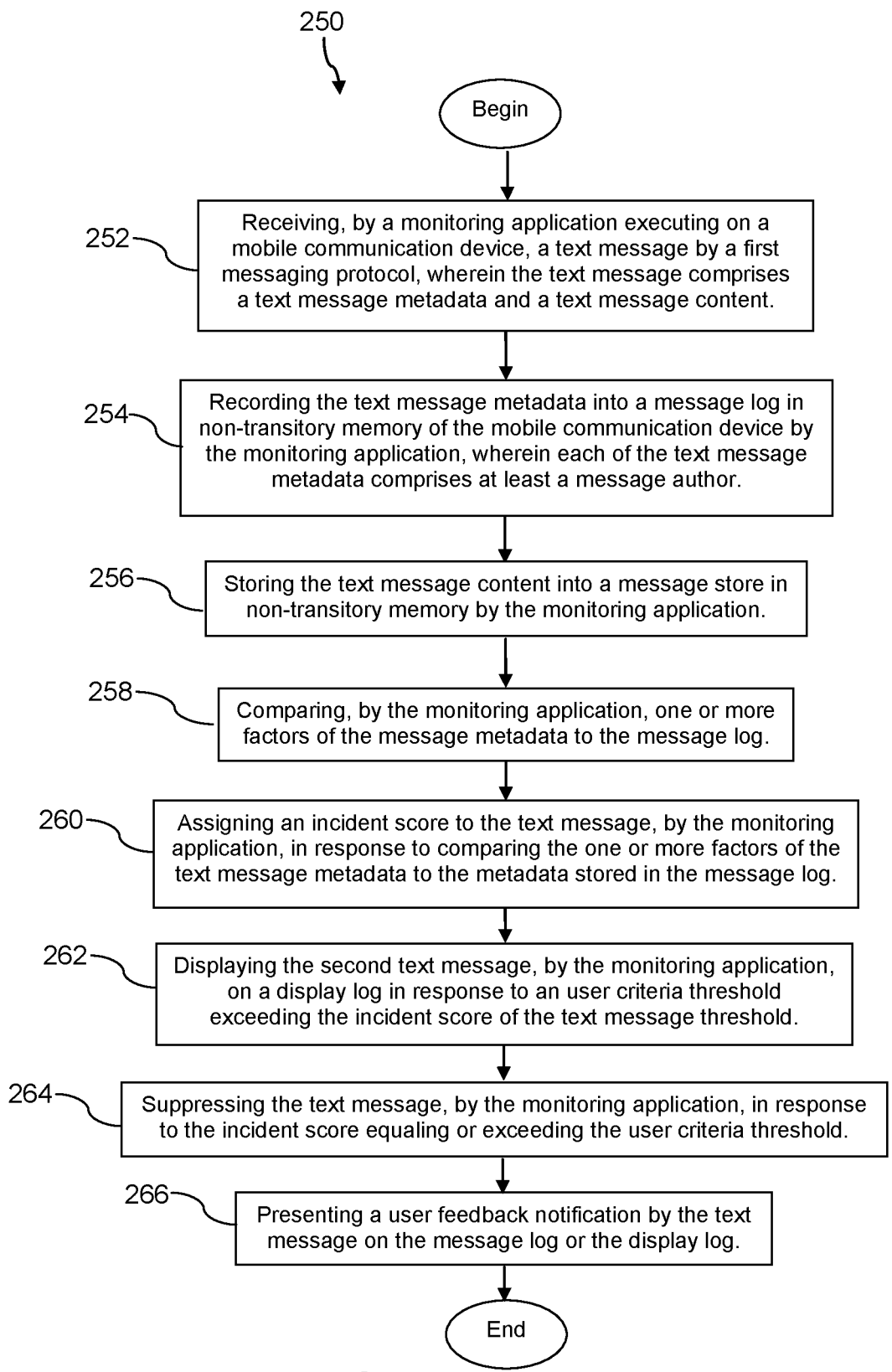
FIG. 7 is a flow chart of a method according to an embodiment of the disclosure.

Turning now to FIG. 7, a method 250 is described. In an embodiment, the method 250 is a computer-implemented adaptable method of monitoring a mobile communication device for duplicate text messages. At step 252, the method 250 comprises receiving, by a monitoring application executing on a mobile communication device, a text message by a first messaging protocol, wherein text message comprises a text message metadata and a text message content.

At block 254, the method 250 comprises recording the text message metadata into a message log in non-transitory memory of the mobile communication device by the monitoring application, wherein each of the text message metadata comprises at least a message author.

At block 256, the method 250 comprises storing the text message content into a message store in non-transitory memory by the monitoring application. At block 258, the method 250 comprises comparing, by the monitoring application, one or more factors of the message metadata to the message log. At block 260, the method 250 comprises assigning an incident score to the text message, by the monitoring application, in response to comparing the one or more factors of the text message metadata to the metadata stored in the message log.

At block 262, the method 250 comprises displaying the text message, by the monitoring application, on a display log in response to an user criteria threshold exceeding the incident score of the text message. At block 264, the method 250 comprises suppressing the text message, by the monitoring application, in response to the incident score equaling or exceeding the user criteria threshold. At block 266, the method 250 comprises presenting a user feedback notification by the text message on the message log or the display log.

Figure 8:
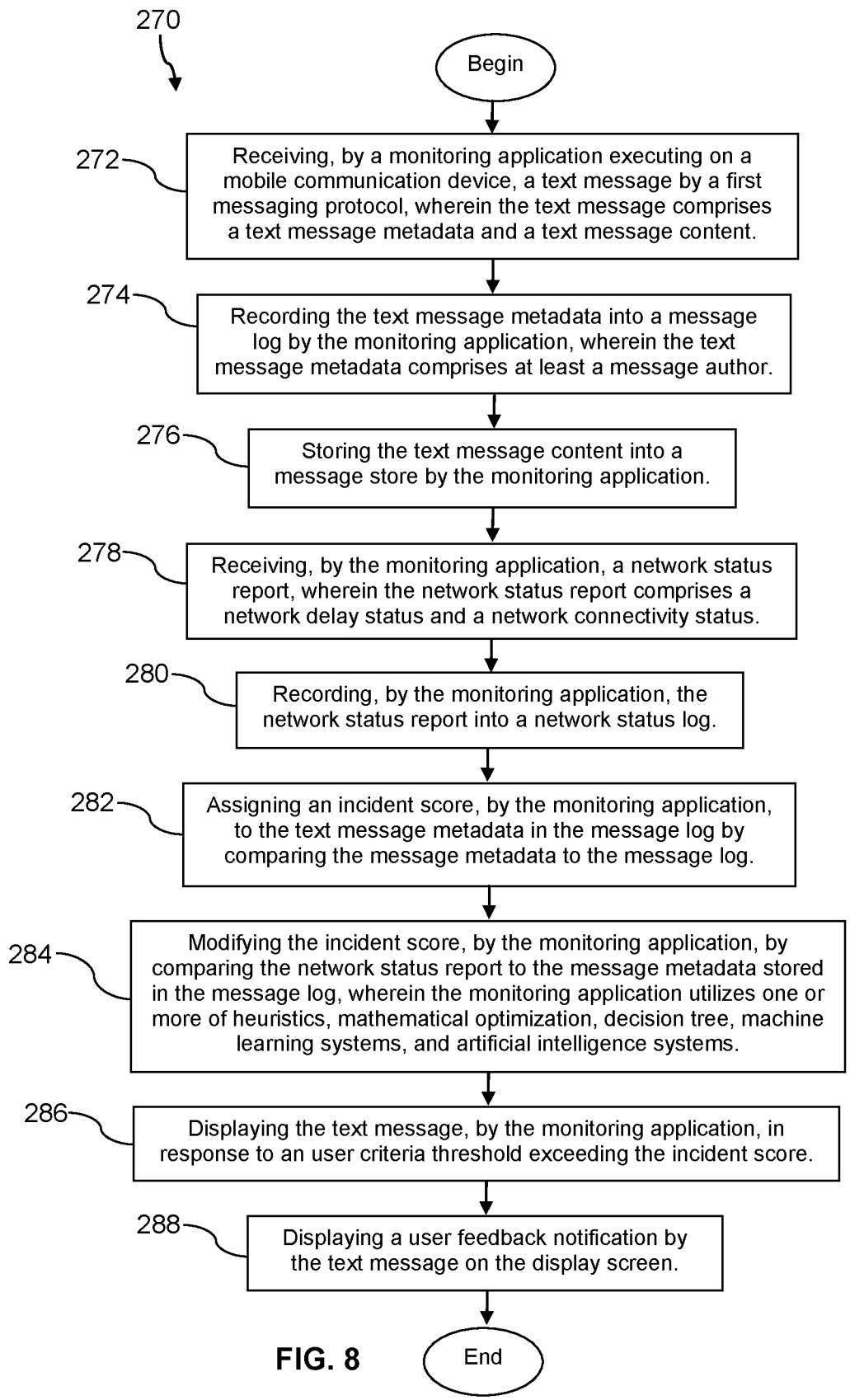
FIG. 8 is a flow chart of another method according to an embodiment of the disclosure.

Turning now to FIG. 8, a method 270 is described. In an embodiment, the method 270 is a computer-implemented adaptable method of monitoring a mobile communication device for duplicate text messages. At block 272, the method 270 comprises receiving, by a monitoring application executing on a mobile communication device, a text message by a first messaging protocol, wherein the text message comprises a text message metadata and a text message content.

At block 274, the method 270 comprises recording the text message metadata into a message log by the monitoring application, wherein the text message metadata comprises at least a message author. At block 276, the method 270 comprises storing the text message content into a message store by the monitoring application.

At block 278, the method 270 comprises receiving, by the monitoring application, a network status report, wherein the network status report comprises a network delay status and a network connectivity status. At block 280, the method 270 comprises recording, by the monitoring application, the network status report into a network status log.

At block 282, the method 270 comprises assigning an incident score, by the monitoring application, to the text message metadata in the message log by comparing the message metadata to the message log. At block 284, the method 270 comprises modifying the incident score, by the monitoring application, by comparing the network status report to the message metadata stored in the message log, wherein the monitoring application utilizes one or more of heuristics, mathematical optimization, decision tree, machine learning systems, and artificial intelligence systems.

At block 286, the method 270 comprises displaying the text message, by the monitoring application, in response to an user criteria threshold exceeding the incident score. At block 288, the method 270 comprises displaying a selectable user feedback notification by the text message on the display screen.

Figure 9:
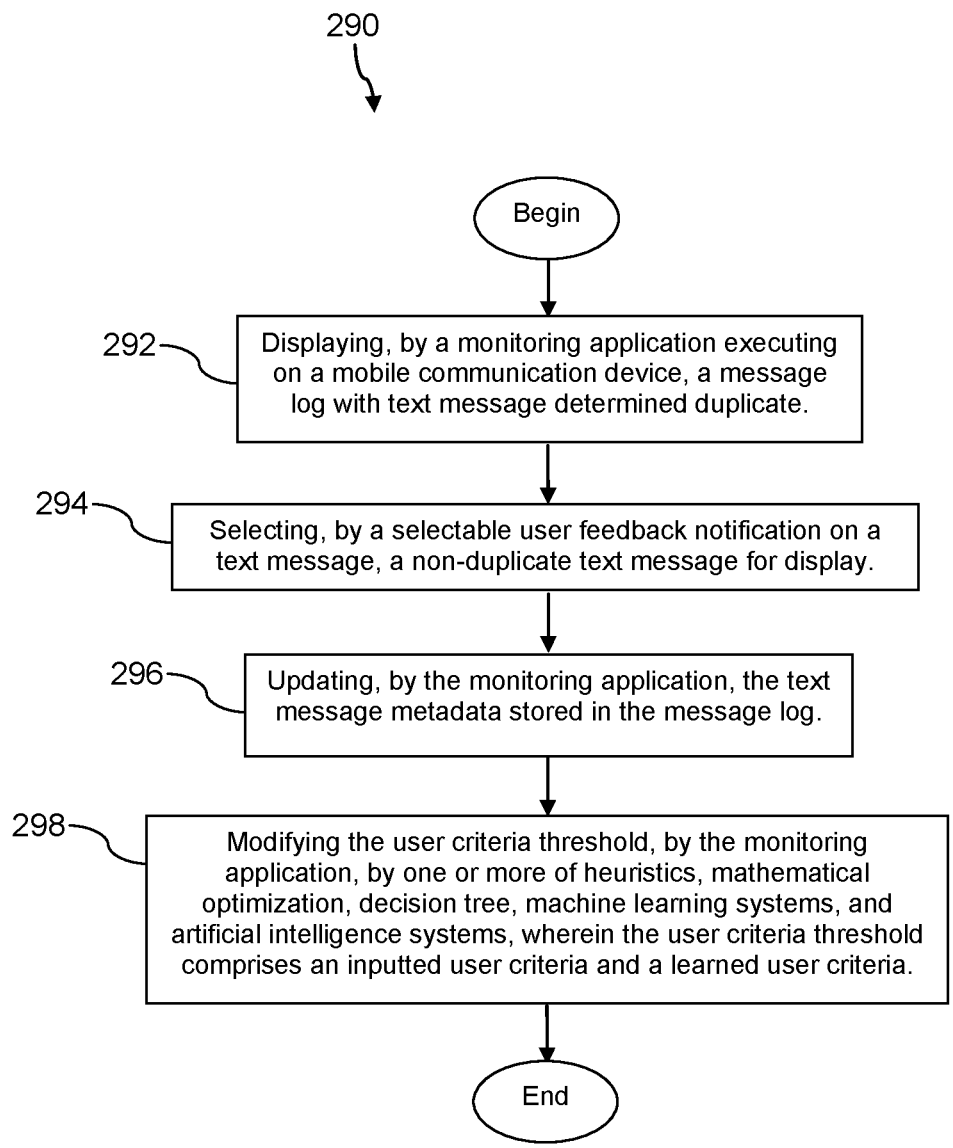
FIG. 9 is a flow chart of yet another method according to an embodiment of the disclosure.

Turning now to FIG. 9, a method 290 is described. In an embodiment, the method 290 is a method of computer-implemented adaptable method of monitoring a mobile communication device for duplicate text messages. At block 292, the method 290 comprises displaying, by a monitoring application executing on a mobile communication device, a message log with text message determined duplicate.

At block 294, the method 290 comprises selecting, by a selectable user feedback notification on a text message, a non-duplicate text message for display. At block 296, the method 290 comprises updating, by the monitoring application, the text message metadata stored in the message log.

At block 298, the method 290 comprises modifying the user criteria threshold, by the monitoring application, by one or more of heuristics, mathematical optimization, decision tree, machine learning systems, and artificial intelligence systems, wherein the user criteria threshold comprises an inputted user criteria and a learned user criteria.

Figure 10:
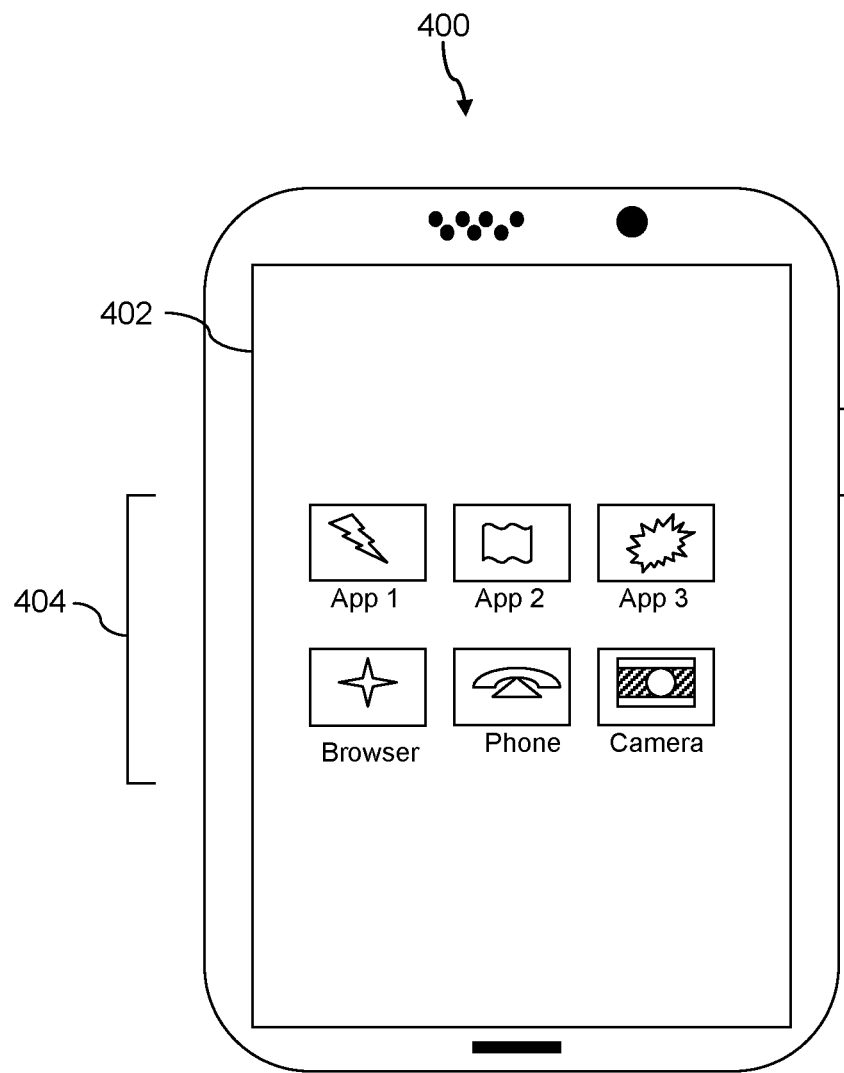
FIG. 10 is an illustration of a mobile communication device according to an embodiment of the disclosure.

FIG. 10 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400, or any other wireless communication network or system.

Figure 11:
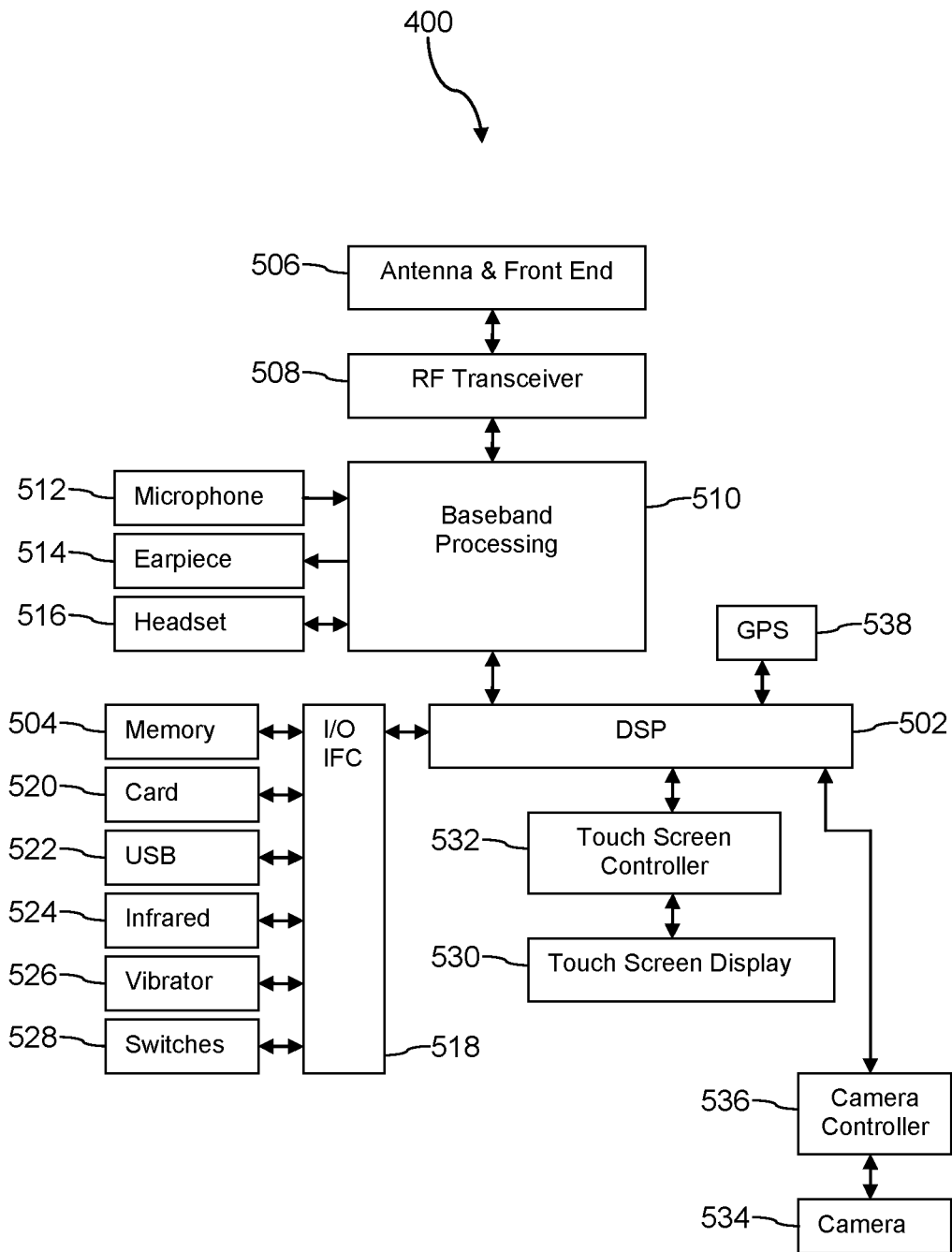
FIG. 11 is a block diagram of a hardware architecture of a mobile communication device according to an embodiment of the disclosure.

FIG. 11 shows a block diagram of the UE 400. While a variety of known components of handsets are depicted, in an embodiment, a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch-sensitive screen. In an embodiment, the UE 400 may include both the touch screen display 530 and additional display component that does not provide a touch-sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive email or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer systems. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example, coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 12A:
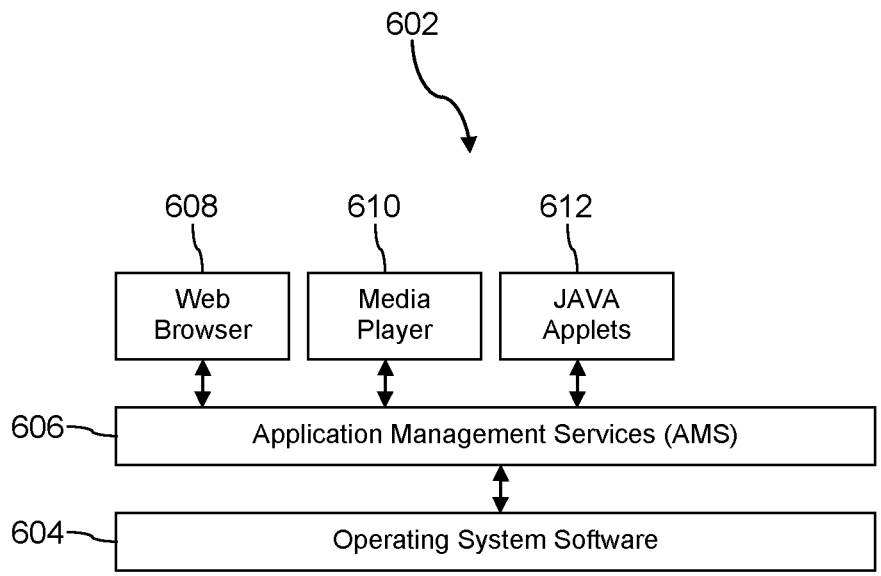
FIG. 12A is a block diagram of a software architecture of a mobile communication device according to an embodiment of the disclosure.

FIG. 12A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 12A are a web browser application 608, a media player application 610, and JAVA applets 612. The web browser application 608 may be executed by the UE 400 to browse content and/or the Internet, for example, when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality, including games, utilities, and other functionality.

Figure 12B:
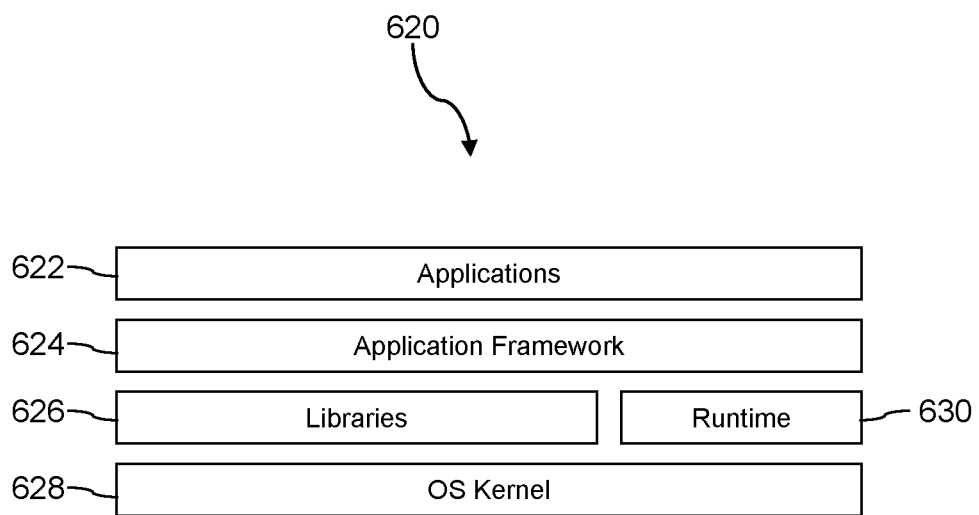
FIG. 12B is a block diagram of another software architecture of a mobile communication device according to an embodiment of the disclosure.

FIG. 12B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 13:
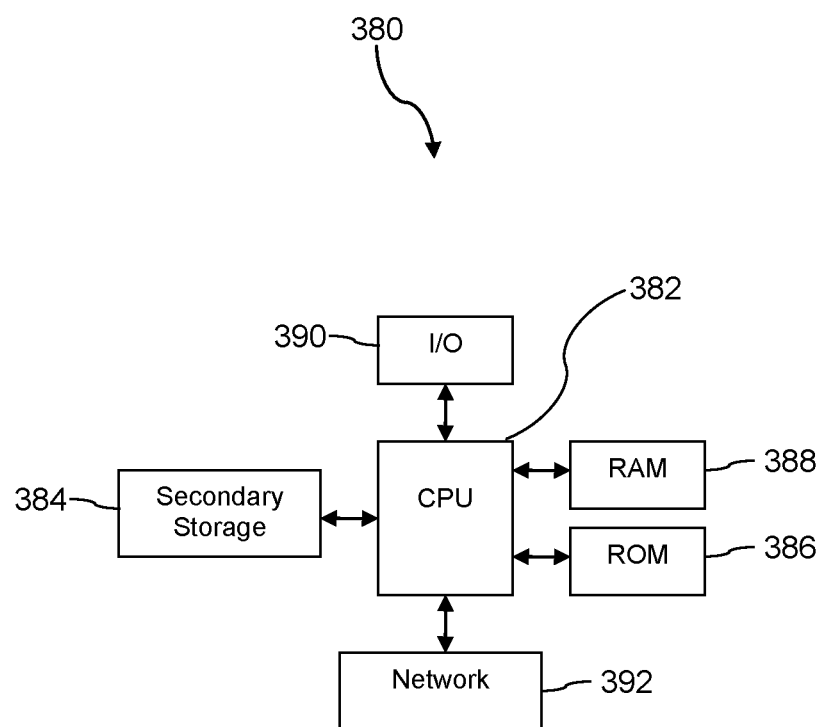
FIG. 13 is a block diagram of a computer system according to an embodiment of the disclosure.

FIG. 13 illustrates a computer system 380 suitable for implementing one or more embodiments disclosed herein. The computer system 380 includes a processor 382 (which may be referred to as a central processor unit or CPU) that is in communication with memory devices including secondary storage 384, read-only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example, in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, trackballs, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example, analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example, by reading from a CD-ROM disk inserted into a disk drive peripheral of the computer system 380. Alternatively, the processor 382 may process the executable instructions and/or data structures by remotely accessing the computer program product, for example, by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-implemented adaptable method of monitoring a mobile communication device for duplicate text messages, comprising:
   receiving, by a monitoring application executing on a mobile communication device, a text message by a first messaging protocol, wherein the text message comprises a text message metadata and a text message content;
   recording the text message metadata into a message log in non-transitory memory of the mobile communication device by the monitoring application, wherein each of the text message metadata comprises at least a message author;
   storing the text message content into a message store in non-transitory memory by the monitoring application;
   comparing, by the monitoring application, one or more factors of the message metadata to the message log;
   assigning an incident score to the text message, by the monitoring application, in response to comparing the one or more factors of the text message metadata to the metadata stored in the message log;

displaying the text message, by the monitoring application, on a display log in response to an user criteria threshold exceeding the incident score of the text message;

suppressing the text message, by the monitoring application, in response to the incident score equaling or exceeding the user criteria threshold; and presenting a user feedback notification by the text message on the message log or the display log.

2. The method of claim 1, wherein the message metadata comprises a message author, message identification, a message timestamp, a message date stamp, a message sender, a message protocol, a message source, a message content size, and a message content.

3. The method of claim 1, wherein the messaging protocol further comprises one of a SMS-IP message, a SMS message, a MMS message, a CDS message, or an OTT message.

4. The method of claim 1, wherein the user criteria threshold comprises an inputted user criteria threshold and a learned user criteria threshold.

5. The method of claim 1, wherein the user feedback selection input identifies the second text message as a duplicate text message.

6. The method of claim 1, wherein the user feedback notification comprises a selectable display option at least one of a button, a highlight, a symbol, or an outline.

7. The method of claim 1, wherein the mobile communication device is a cell phone, a mobile phone, a smartphone, a smartwatch, a personal digital assistant, a laptop computer, a notebook computer, or a tablet computer.

\* \* \* \* \*